(12) United States Patent
Liao

(10) Patent No.: US 7,210,387 B2
(45) Date of Patent: May 1, 2007

(54) VERTICAL BAND SAW MACHINE

(76) Inventor: Juei-Seng Liao, No. 396, Yung-Ming St., Ta-Li City, Taichung Hsien (TW)

(*) Notice: Subject to any disclaimer, the term of this patent is extended or adjusted under 35 U.S.C. 154(b) by 438 days.

(21) Appl. No.: 10/940,157

(22) Filed: Sep. 14, 2004

(65) Prior Publication Data
US 2005/0252355 A1 Nov. 17, 2005

(30) Foreign Application Priority Data
May 11, 2004 (TW) .............................. 93207280 U

(51) Int. Cl.
B23D 55/10 (2006.01)
(52) U.S. Cl. ......................................... 83/816; 83/814
(58) Field of Classification Search ................. 83/814, 83/816–819
See application file for complete search history.

(56) References Cited

U.S. PATENT DOCUMENTS

| 780,425 | A | * | 1/1905 | Hinkley ........................ 83/818 |
| 1,449,015 | A | * | 3/1923 | Schenkel ...................... 83/804 |
| 1,704,428 | A | * | 3/1929 | Dempewolf et al. .......... 83/818 |
| 1,757,785 | A | * | 5/1930 | Sullenberger ................ 83/62.1 |
| 1,879,145 | A | * | 9/1932 | Erickson ...................... 83/818 |
| 2,627,288 | A | * | 2/1953 | Steiner ........................ 83/810 |
| 2,798,518 | A | * | 7/1957 | Gray ............................ 30/374 |
| 3,390,598 | A | * | 7/1968 | Sands et al. .................. 83/820 |
| 4,356,750 | A | * | 11/1982 | Legler et al. ................. 83/816 |
| 4,413,414 | A | * | 11/1983 | Strzalka ....................... 30/380 |
| 6,591,729 | B1 | * | 7/2003 | Novak .......................... 83/788 |

* cited by examiner

Primary Examiner—Kenneth E. Peterson
(74) Attorney, Agent, or Firm—Ostrolenk, Faber, Gerb & Soffen, LLP

(57) ABSTRACT

A vertical band saw machine includes a base, an upright post extending from the base, a mounting frame slidably retained relative to the upright post, upper and lower blade mounting pulleys and a tension-equalizing guider pulley rotatably mounted on the mounting frame, the base and the upright post, respectively, an endless band saw blade trained on the pulleys to define upper and lower inclined side paths, and a tension adjusting member disposed to displace the mounting frame between a loosened position to facilitate replacement of the blade, and a tensed position. The guider pulley is brought into synchronized movement with the mounting frame such that the ratio of lengths between the upper and lower inclined side paths is kept unchanged.

7 Claims, 9 Drawing Sheets

VERTICAL BAND SAW MACHINE

CROSS-REFERENCE TO RELATED APPLICATION

This application claims priority of Taiwanese Application No. 093207280, filed on May 11, 2004.

BACKGROUND OF THE INVENTION

1. Field of the Invention

This invention relates to a vertical band saw machine, more particularly to a vertical band saw machine having an endless band saw blade that is convenient to replace.

2. Description of the Related Art

Referring to FIG. 1, a conventional vertical band saw machine 10 is shown to include a base 12 with a worktable 16 for supporting a workpiece (not shown), a coupling unit 11 which includes a lower coupler 111 secured to the base 12, an upper coupler 112, and a spacer 113 interposed between the lower and upper couplers 111,112 and secured together by means of a screw fastener 114, a mounting frame 13 secured to the upper coupler 112, upper and lower blade mounting pulleys 15,14 rotatably mounted on the mounting frame 13 and the base 12, and an endless band saw blade 17 trained on the pulleys 15,14 and passing through the worktable 16. When it is desired to replace the band saw blade 17, the screw fastener 114 is first loosened to permit removal of the spacer 113 so as to shorten the distance between the pulleys 15,14 for facilitating removal of the band saw blade 17. Subsequently, a new saw blade 17 is then trained on the pulleys 15,14. The spacer 113 is again mounted between the upper and lower couplers 112,111, and is secured by tightening the screw fastener 114. Therefore, the replacement of the band saw blade 17 as such is relatively inconvenient to conduct. Besides, the construction of the coupling unit 11 can be used only for a predetermined size of the band saw blade 17. Moreover, the coupling unit 11 does not provide tension adjusting means for appropriately adjusting the tension of the band saw blade 17 to maintain good sawing quality after a period of use.

SUMMARY OF THE INVENTION

An object of the present invention is to provide a vertical band saw machine which facilitates replacement of an endless band saw blade and which has a tension-equalizing mechanism to maintain a desired tension force of the band saw blade.

Another object of the present invention is to provide a vertical band saw machine which permits tension adjustment of an endless band saw blade for achieving good sawing quality.

According to this invention, the vertical band saw machine comprises a base which includes a front support end, a rear support end opposite to the front support end in a longitudinal direction, and a first mount area interposed between the front and rear support ends. A worktable is disposed to rest on the front support end, and is adapted to position a workpiece to be worked. An upright post extends in an upright direction from the rear support end, and terminates at an upper post end. A mounting frame includes a coupling end retainingly slidable relative to the upright post in the upright direction, a vertical path setting end which is opposite to the coupling end in the longitudinal direction, and which is disposed over and which is spaced apart from the worktable in the upright direction, and a second mount area interposed between the coupling end and the vertical path setting end. Lower and upper blade mounting pulleys are mounted on and are rotatable relative to the first and second mount areas respectively about first and second axes in an axial direction transverse to both the longitudinal direction and the upright direction. A motor is provided with a motor shaft to drive one of the upper and lower blade mounting pulleys. An endless band saw blade is trained on the upper and lower blade mounting pulleys so as to be driven by the motor shaft, and defines a front vertical running path that runs from the vertical path setting end down into the front support end through the worktable. A tension-equalizing guider pulley is mounted on and is rotatable relative to the upright post about a third axis in the axial direction, and is trained by the endless band saw blade so as to define, in respective cooperation with the upper and lower blade mounting pulleys, upper and lower inclined side paths. The tension-equalizing guider pulley is retainingly movable relative to the upright post in the upright direction, and is brought into synchronized movement with the coupling end such that the ratio of lengths between the upper and lower inclined side paths is kept unchanged. A tension adjusting member is disposed to displace the coupling end along the upright post from a loosened position where the upper and lower blade mounting pulleys are closer to each other to thereby facilitate replacement of the endless band saw blade, to a tensed position where the upper and lower blade mounting pulleys are remote from each other so as to enable the endless band saw blade to be driven to run along the front vertical running path.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
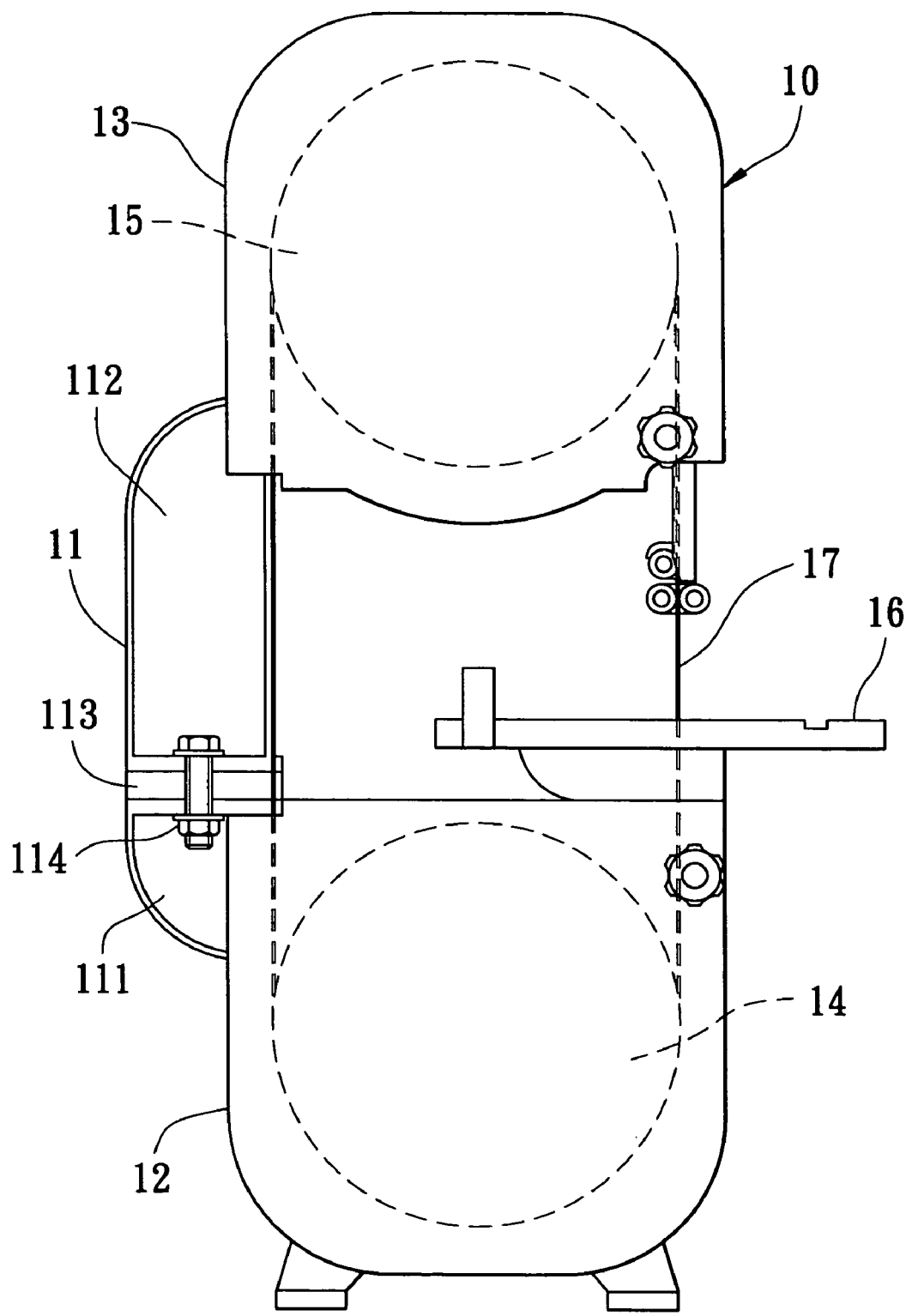
FIG. 1 is a schematic side view of a conventional vertical band saw machine.
Figure 2:
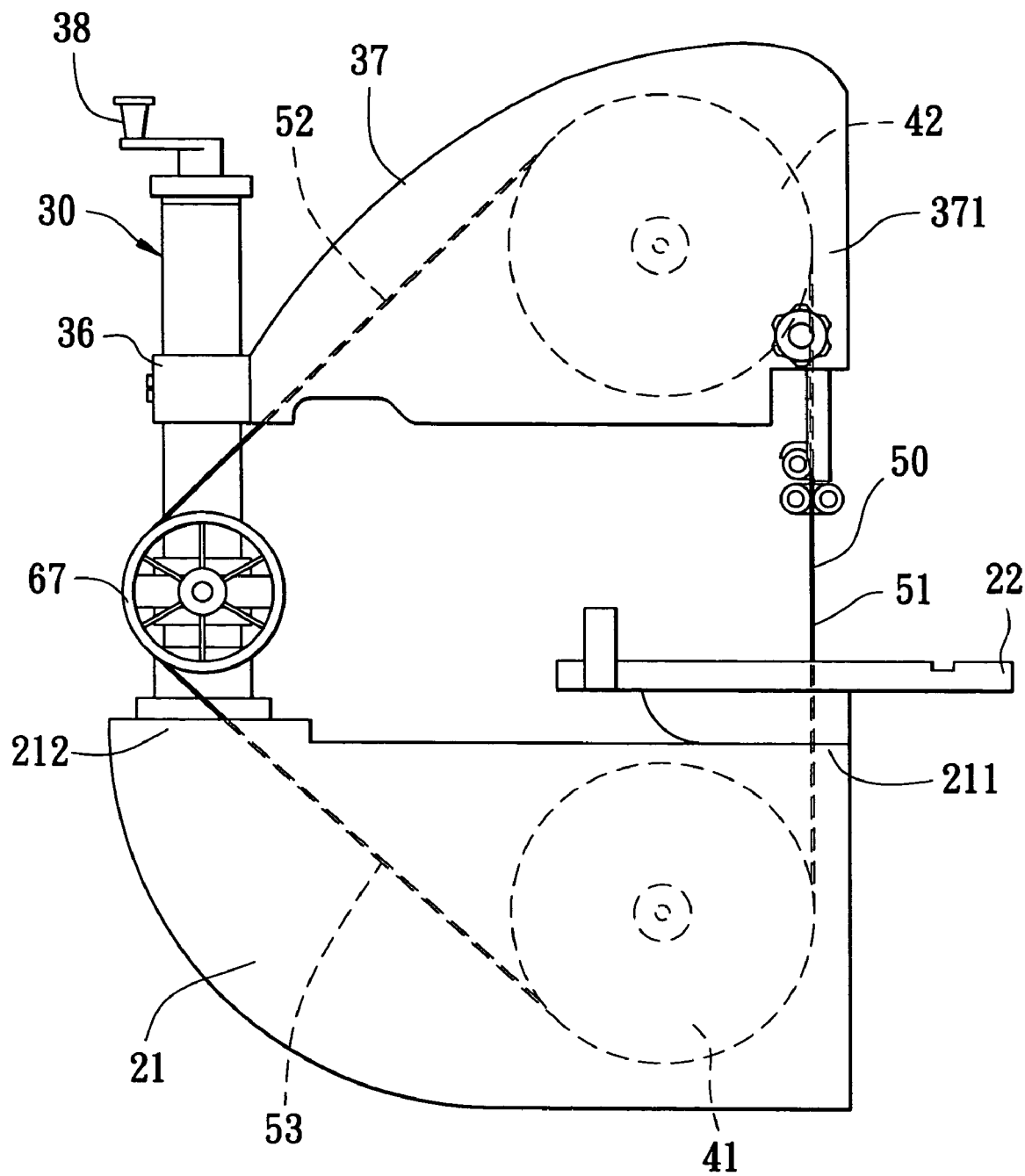
FIGS. 2 and 3 are schematic side views of the preferred embodiment of a vertical band saw machine according to this invention.
Figure 3:
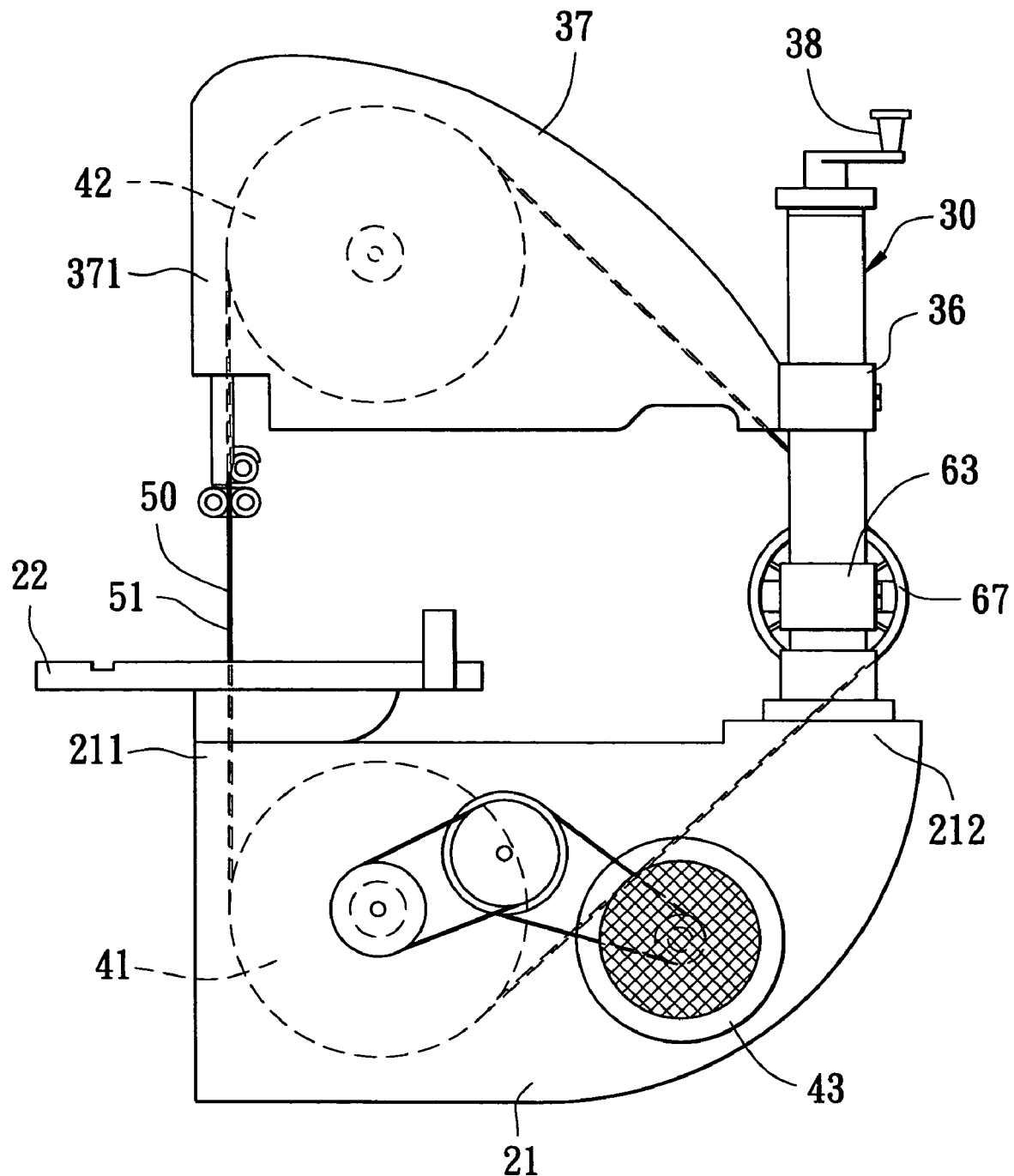
Figure 4:
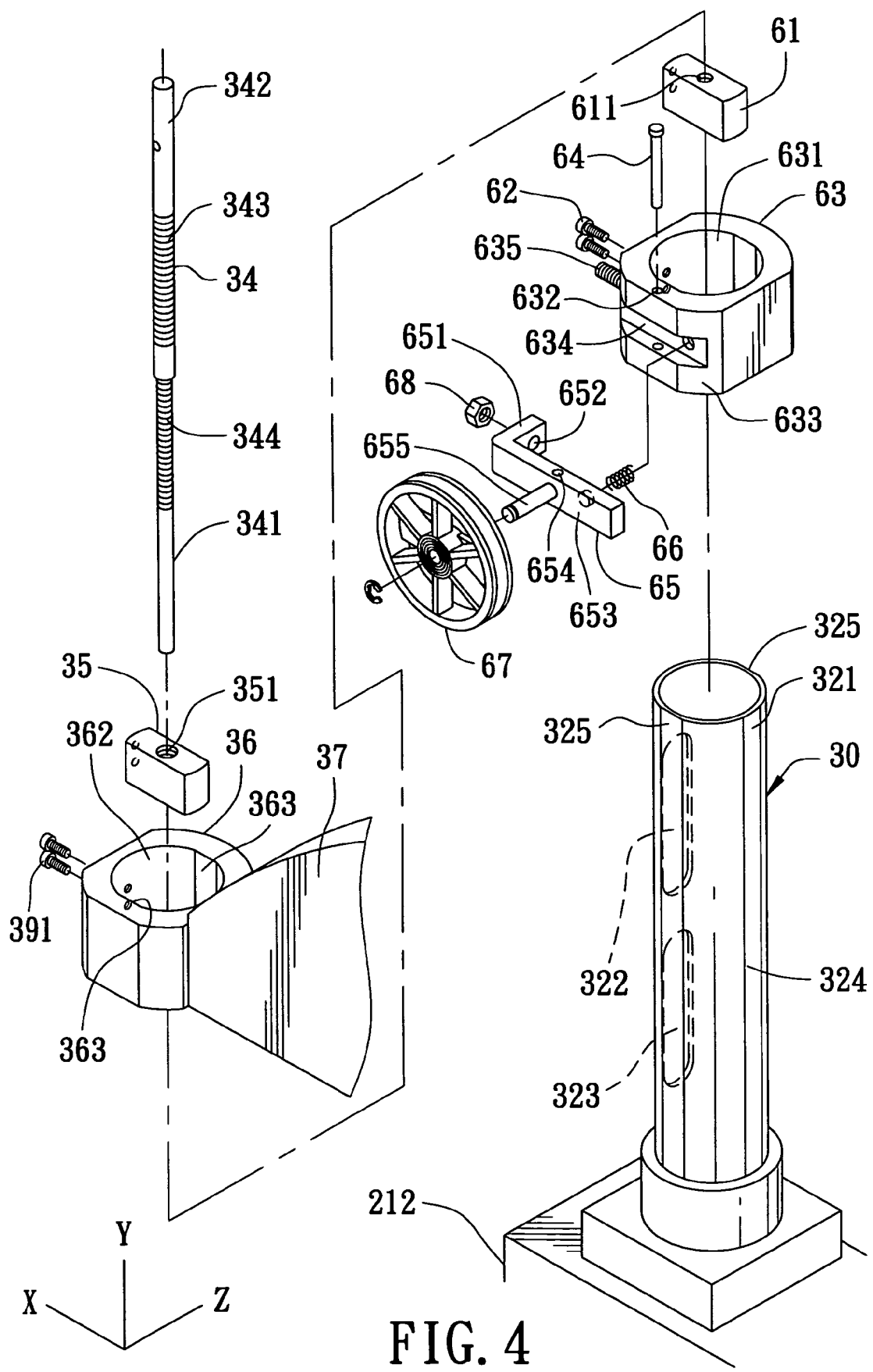
FIG. 4 is an exploded perspective view of a portion of the preferred embodiment.

Referring to FIGS. 2 to 5, the preferred embodiment of a vertical band saw machine according to the present invention is shown to comprise a base 21, a worktable 22, an upright post 30, a mounting frame 37, lower and upper blade mounting pulleys 41,42, a motor 43, an endless band saw blade 50, a tension-equalizing guider pulley 67, a tension adjusting member, and an overtension protecting mechanism 70.

The base 21 includes a front support end 211, a rear support end 212 opposite to the front support end 211 in a longitudinal direction (X), and a first mount area interposed between the front and rear support ends 211,212. The worktable 22 is disposed to rest on the front support end 211 for positioning a workpiece (not shown) to be worked. The upright post 30 is in the form of a tube which extends in an upright direction (Y) from the rear support end 212 and which terminates at an upper post end 321. The upright post 30 has first and second elongated slots 322,323 extending in the upright direction (Y), and two opposite flat surfaces 325 formed on an outer surface 324 thereof and extending in the upright direction (Y).

The mounting frame 37 includes a coupling end 36 which is in the form of a sleeve slidably sleeving on the outer surface 324 of the upright post 30. The coupling end 36 has an inner surface 362 formed with two opposite flat surfaces 363 which extend in the upright direction (Y) for engagement with the flat surfaces 325, respectively, so that the sleeve has a spline engagement with the upright post 30, i.e. slidable along but non-rotatable relative to the upright post 30. The mounting frame 37 includes a vertical path setting end 371 which is opposite to the coupling end 36 in the longitudinal direction (X), and which is disposed over and which is spaced apart from the worktable 22 in the upright direction (Y), and a second mount area which is interposed between the coupling end 36 and the vertical path setting end 371.

The lower and upper blade mounting pulleys 41,42 are mounted on and are rotatable relative to the first and second mount areas, respectively, about first and second axes in an axial direction (Z) transverse to both the longitudinal direction (X) and the upright direction (Y).

The motor 43 is mounted on the base 21, and is provided with a motor shaft (not shown) disposed to drive the lower blade mounting pulley 41 in a known manner.

The endless band saw blade 50 is trained on the upper and lower blade mounting pulleys 42,41 so as to be driven by the motor shaft of the motor 43, and defines a front vertical running path 51 which runs from the vertical path setting end 371 down into the front support end 211 through the worktable 22.

The tension adjusting member includes a driving shaft 34 which extends in the upright direction (Y) and which is rotatably disposed in the upright post 30 by means of an anti-friction bearing 33 that is interposed between the upright post 30 and the driving shaft 34 and that is disposed adjacent to the upper post end 321 so as to enable the driving shaft 34 to be rotatable relative to the upright post 30 about a shaft axis in the upright direction (Y). The driving shaft 34 includes a lower shaft portion 341 which has first and second externally threaded segments 343,344 with different thread pitches and registered with the first and second elongated slots 322,323, respectively, and an upper shaft portion 342 which extends upwardly and outwardly of the upper post end 321.

A first sliding block 35 is secured to the inner surface 362 of the coupling end 36 of the mounting frame 37 by means of screws 391, and has a first internally threaded portion 351 which extends along the shaft axis so as to threadedly engage the first externally threaded segment 343 of the driving shaft 34.

A coupling member 63 is in the form of a sleeve slidably sleeving on the outer surface 324 of the upright post 30. The coupling member 63 includes an inner surface 631 that has a spline engagement with the upright post 30, i.e. slidable along but non-rotatable relative to the upright post 30, and an outer surface 633 which is formed with a slot 634 and a screw bolt 635 extending in the longitudinal direction (X).

A second sliding block 61 is secured to the inner surface 631 of the coupling member 63 by means of screws 62, and has a second internally threaded portion 611 which extends along the shaft axis so as to threadedly engage the second externally threaded segment 344 of the driving shaft 34.

An L-shaped actuating lever 65 has a retained end 651 which is formed with a hole 652 to engage the screw bolt 635 and a screw nut 68 so as to be loosenably retained to the coupling member 63, an urged end 653 which is opposite to the retained end 651 in the longitudinal direction (X) and which can be received in the slot 634, and a middle portion which is interposed between the retained and urged ends 651,653 and which is pivotally mounted on the coupling member 63 by means of a pivot pin 64 that extends along a pivot axis in the upright direction (Y) and that engages a pivot hole 654 in the middle portion of the actuating lever 65 and two pivot holes 632 in the coupling member 63.

An axle shaft 655 is mounted on and extends from the middle portion of the actuating lever 65 along a third axis. A biasing member 66, such as a compression spring 66, is disposed to bias the urged end 653 to turn about the pivot axis away from the slot 634.

The tension-equalizing guider pulley 67 is rotatably mounted on the axle shaft 655 about the third axis, and is trained by the endless band saw blade 50 so as to define, in respective cooperation with the upper and lower blade mounting pulleys 42,41, upper and lower inclined side paths 52,53.

Figure 5:
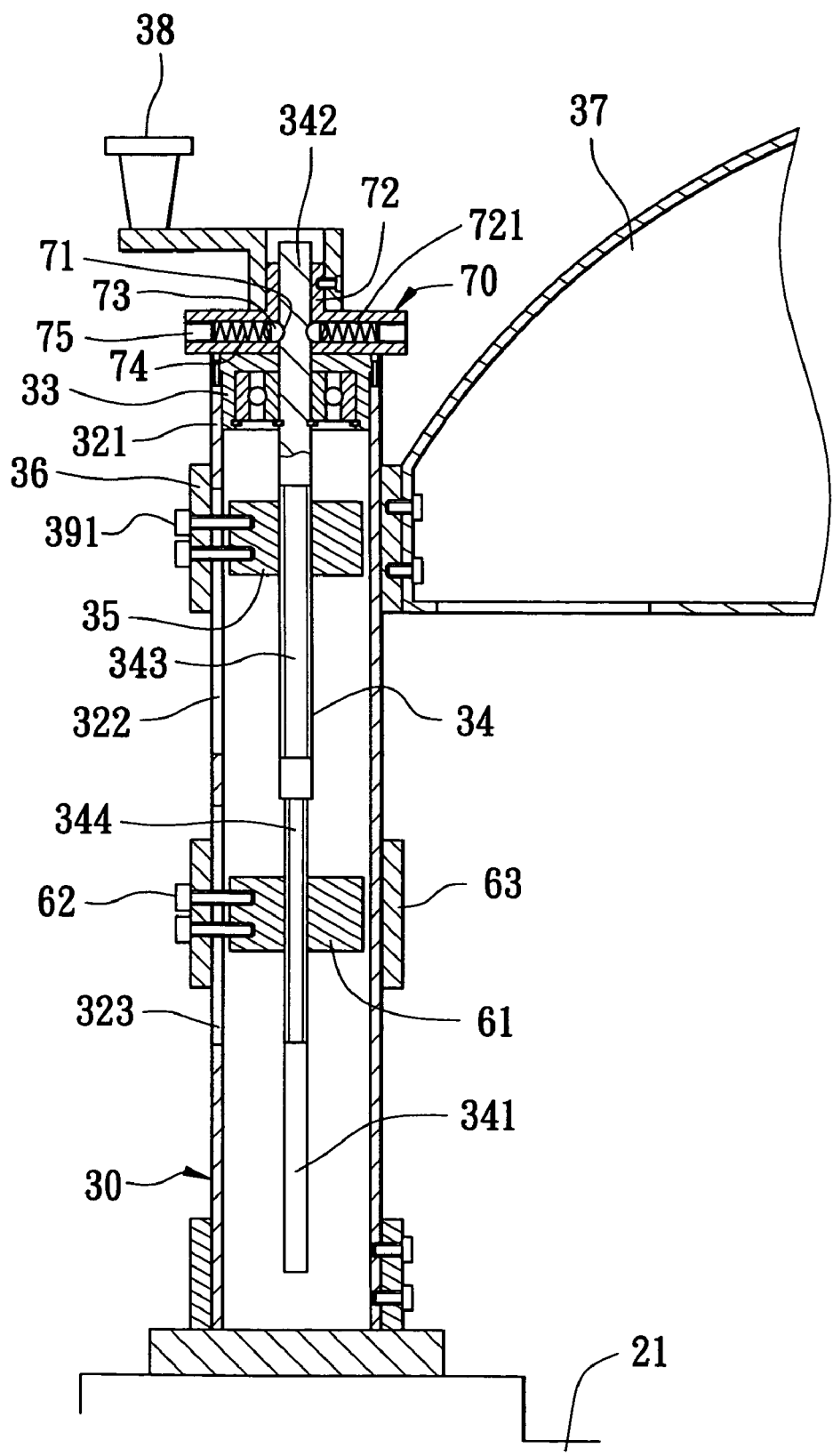
FIGS. 5 and 6 are sectional views showing a mounting frame in higher and lower positions, respectively.
Figure 6:
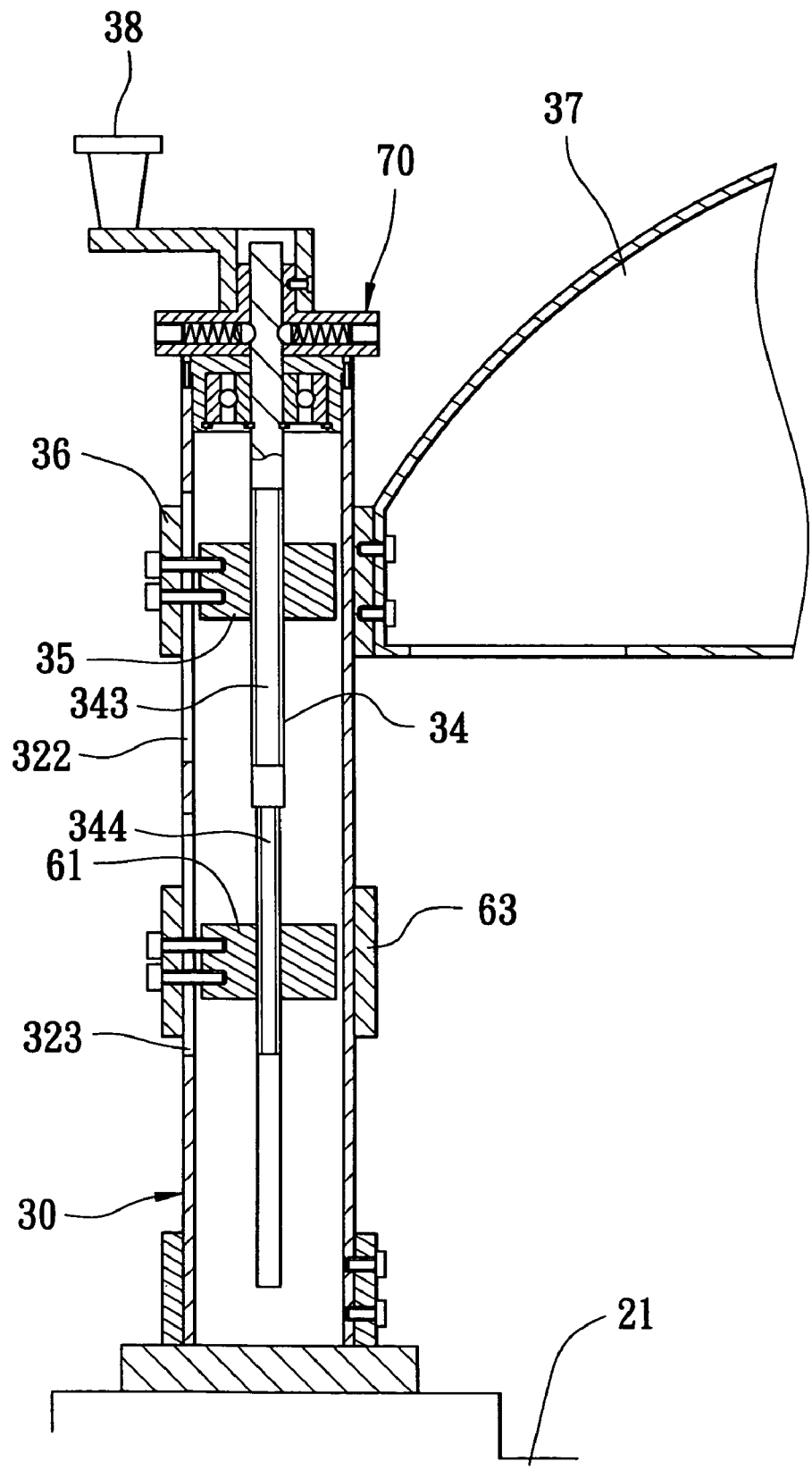
Figure 7:
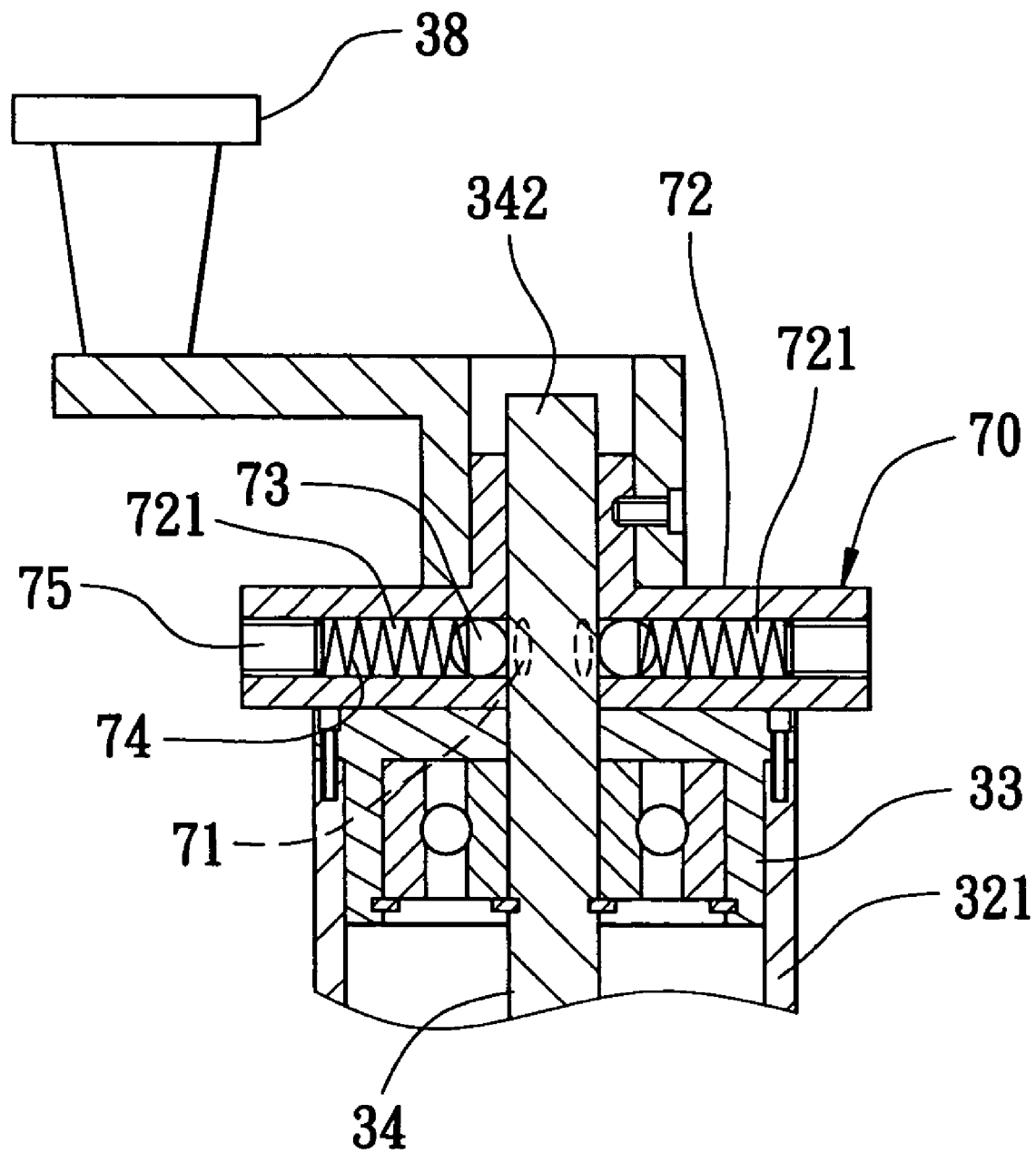
FIG. 7 is a fragmentary sectional view showing an over-tension protecting mechanism of the preferred embodiment.
Figure 8:
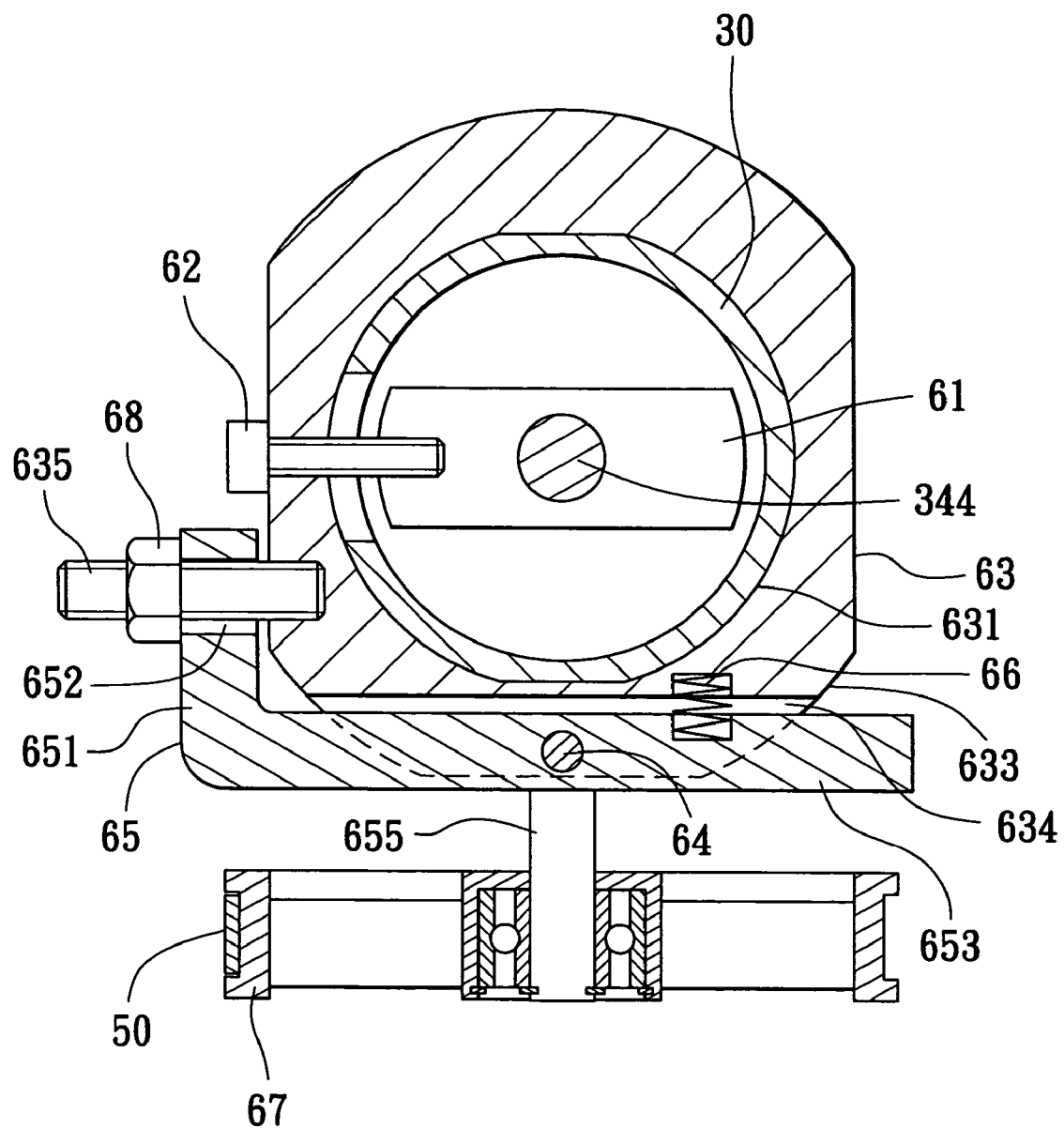
FIGS. 8 and 9 are sectional views showing a tension-equalizing guider pulley of the preferred embodiment in two different positions.
Figure 9:
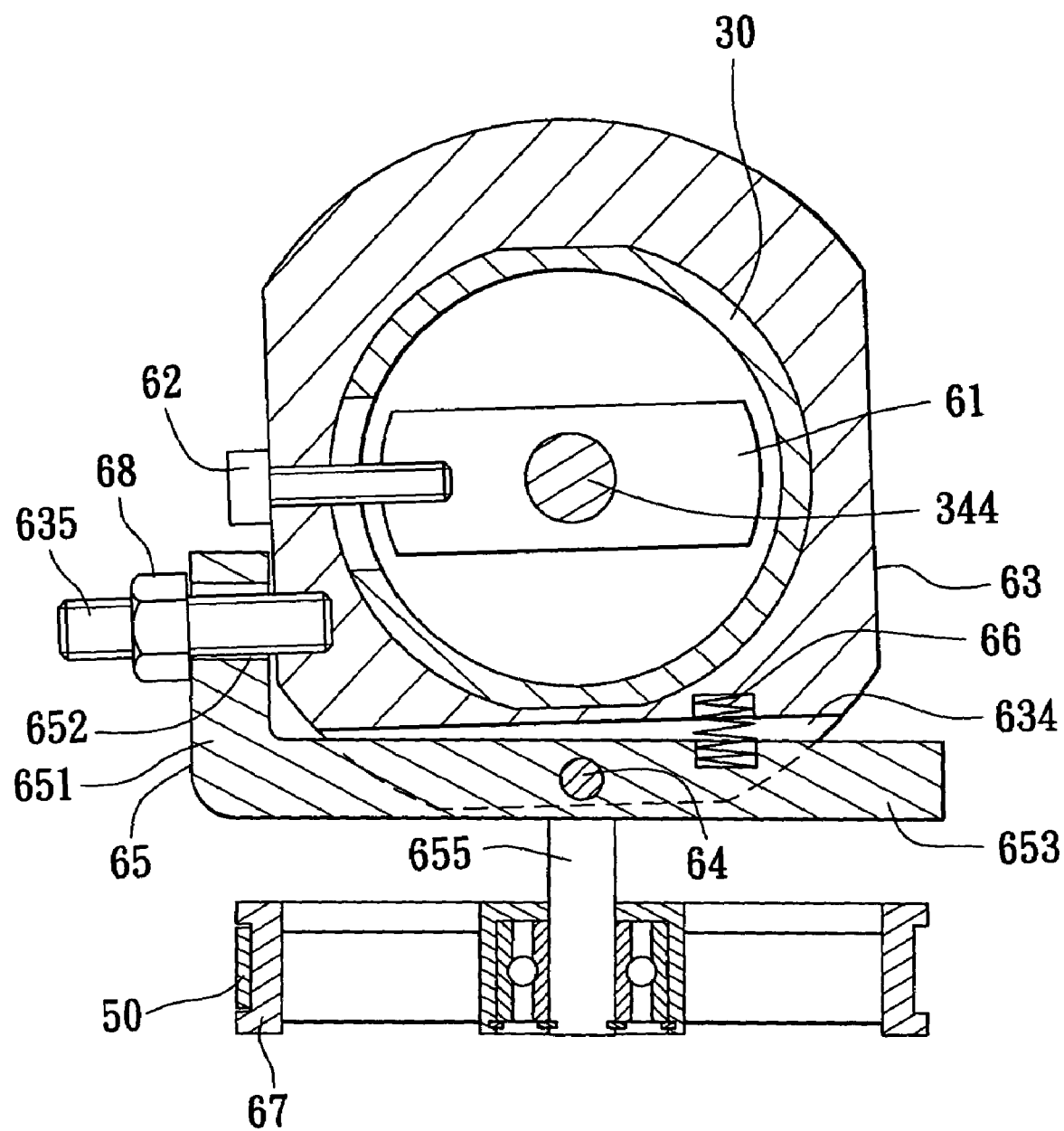

With reference to FIGS. 5 and 7, the overtension protecting mechanism 70 includes a plurality of recesses 71 which are formed in the upper shaft portion 342 and which are angularly displaced from each other about the shaft axis. A handle has an actuating end 72 which is in the form of a sleeve to rotatably sleeve on the upper shaft portion 342 and which has a plurality of radially extending slots 721, each for receiving a rollable member 73, a spring 74 and a screw bolt 75 in sequence, and an operated end 38 which is manually operable to rotate the actuating end 72 about the shaft axis. Thus, each spring-loaded rollable member 73 can be moved between an engaging position to engage the respective recess 71 by a predetermined biasing force of the respective spring 74 so as to permit rotational force of the actuating end 72 to be transferred for rotating the upper shaft portion 342, and a disengaging position to be forced out of engagement with the recesses 71. The screw bolt 75 can be rotated to adjust the predetermined biasing force of the respective spring 74 to bias the rollable member 72 to the engaging position.

When it is desired to replace the band saw blade 50 trained on the pulleys 41,42,67, as shown in FIGS. 2, 4, 5 and 6, the operated end 38 is operated manually to rotate the actuating end 72 about the shaft axis. Due to the engagement of the rollable members 73 with the recesses 71, the driving shaft 34 is rotated about the shaft axis such that the coupling end 36 of the mounting frame 37 and the coupling member 63 are synchronously brought to slide downwardly along the shaft axis to a loosened position. Therefore, the upper blade mounting pulley 42 and the tension-equalizing guider pulley 67 are lowered to be closer to the lower blade mounting pulley 41 to thereby facilitate replacement of the band saw blade 50.

When a new band saw blade 50 is placed on the pulleys 42,41,67, the operated end 38 is operated manually in an opposite rotational direction to rotate the driving shaft 34 so that the coupling end 36 and the coupling member 63 are synchronously brought to slide upwardly along the shaft axis to a tensed position remote from the lower blade mounting pulley 41 so as to enable the new band saw blade 50 to be driven to run along the front vertical running path. It is noted that the first and second externally threaded segments 343, 344 are configured to have a ratio of thread pitch such that the lengths of the upper and lower inclined side paths 52,53 can remain equal to each other. Thus, the tension-equalizing guider pulley 67 is brought into synchronized movement with the coupling end 36 of the mounting frame 37 to keep the ratio unchanged, thereby maintaining good sawing quality for the band saw blade 50.

Referring to FIG. 7, when the band saw blade 50 is tensed by a predetermined tension force that holds the upper shaft portion 342 against rotation with the spring-loaded rollable members 73, the rollable members 73 are disengaged from the recesses 71 so as to interrupt transfer of the rotational force of the actuating end 72 to the upper shaft portion 342, thereby preventing overtensing of the band saw blade 50.

Further, referring to FIGS. 2, 4, 8 and 9, when it is desired to perform a finer adjustment of the tension of the band saw blade 50, the screw nut 68 is screwed outwardly to loosen the retained end 651 of the actuating lever 65. The urged end 653 is turned by biasing action of the biasing member 66 so as to tilt the axle shaft 655 about the pivot axis of the pivot pin 64, thereby enabling the finer adjustment of the tension of the band saw blade 50 while still keeping the lengths of the upper and lower inclined side paths 52,53 equal to each other.

As illustrated, according to this invention, during replacement of the band saw blade 50, the user merely rotates the operated end 38 of the handle to displace the mounting frame 37 to the loosened position or the tensed position, thereby rendering the replacement operation convenient. In addition, by virtue of the overtension protecting mechanism 70, the rollable members 73 can disengage from the recesses 71 by a predetermined tension force of the band saw blade 50, thereby preventing overtensing of the band saw blade 50 during the displacement of the mounting frame 37 to the tensed position. Furthermore, the tension-equalizing guider pulley 67 is movable with the mounting frame 37 to keep the ratio of the lengths between the upper and lower inclined side paths 52,53 equal to each other, and is tilted relative to the upright post 30 to perform a finer adjustment of the tension of the band saw blade 50, thereby ensuring good sawing quality of the band saw blade 50.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A vertical band saw machine comprising:
    a base which includes a front support end, a rear support end opposite to said front support end in a longitudinal direction, and a first mount area interposed between said front and rear support ends;
    a worktable which is disposed to rest on said front support end and which is adapted to position a workpiece to be worked;
    an upright post which extends in an upright direction from said rear support end and which terminates at an upper post end;
    a mounting frame including a coupling end disposed to be slidably retained relative to said upright post in the upright direction, a vertical path setting end which is opposite to said coupling end in the longitudinal direction, and which is disposed over and which is spaced apart from said worktable in the upright direction, and a second mount area which is interposed between said coupling end and said vertical path setting end;
    lower and upper blade mounting pulleys mounted on and rotatable relative to said first and second mount areas respectively about first and second axes in an axial direction transverse to both the longitudinal direction and the upright direction;
    a motor provided with a motor shaft that is disposed to drive one of said upper and lower blade mounting pulleys;
    an endless band saw blade which is trained on said upper and lower blade mounting pulleys so as to be driven by said motor shaft, and which defines a front vertical running path that runs from said vertical path setting end down into said front support end through said worktable;
    a tension-equalizing guider pulley which is mounted on and which is rotatable relative to said upright post about a third axis in the axial direction, and which is trained by said endless band saw blade so as to define, in respective cooperation with said upper and lower blade mounting pulleys, upper and lower inclined side paths, said tension-equalizing guider pulley being further disposed to be retainingly movable relative to said upright post in the upright direction, and being brought into synchronized movement with said coupling end such that the ratio of lengths between the upper and lower inclined side paths is kept unchanged; and
    a tension adjusting member disposed to displace said coupling end along said upright post from a loosened position where said upper and lower blade mounting pulleys are closer to each other to thereby facilitate replacement of said endless band saw blade, to a tensed position where said upper and lower blade mounting pulleys are remote from each other so as to enable said endless band saw blade to be driven to run along the front vertical running path.

2. The vertical band saw machine of claim 1, wherein said coupling end has a spline engagement with said upright post so as to be slidable relative to said upright post in the upright direction, said tension adjusting member including
    a first internally threaded portion which is disposed on said coupling end and which extends in the upright direction, and
    a driving shaft including a lower shaft portion which has a first externally threaded segment that extends along a shaft axis in the upright direction and that threadedly engages said first internally threaded portion, and an upper shaft portion which extends upwardly and outwardly of said upper post end to be operable manually for rotation about the shaft axis such that rotation of said upper shaft portion brings said coupling end to slide along the shaft axis for displacement between the loosened position and the tensed position.

3. The vertical band saw machine of claim 2, wherein said tension adjusting member further includes
    a coupling member which has a spline engagement with said upright post so as to be slidable relative to said upright post in the upright direction, and which has a second internally threaded portion extending along the shaft axis, and
    a second externally threaded segment which is disposed on and which extends along said lower shaft portion and which threadedly engages said second internally threaded portion such that rotation of said driving shaft brings said coupling member into the synchronized movement along the shaft axis with said coupling end of said mounting frame, said tension-equalizing guider pulley being mounted to be rotatable relative to said coupling member about the third axis and to be movable with said coupling member along the shaft axis so as to keep the ratio of lengths between the upper and lower inclined side paths unchanged.

4. The vertical band saw machine of claim 3, wherein said first and second externally threaded segments are configured to have a ratio of thread pitch such that the lengths of the upper and lower inclined side paths remain equal to each other.

5. The vertical band saw machine of claim 4, wherein said tension adjusting member further includes an actuating lever which has a retained end loosenably retained to said coupling member, an urged end which is opposite to said retained end in a direction transverse to the third axis, and a middle portion which is interposed between said retained and urged ends and which is pivotally mounted on said coupling member about a pivot axis in the upright direction, an axle shaft which is mounted on and which extends from said middle portion along the third axis, said tension-equalizing guider pulley being rotatably mounted on said axle shaft, and a biasing member disposed to bias said urged end to turn about the pivot axis away from said coupling member such that, when said retained end is loosened, said urged end is turned by biasing action of said biasing member so as to tilt said axle shaft about the pivot axis to enable a finer adjustment of the tension of said endless band saw blade while still keeping the lengths of the upper and lower inclined side paths equal to each other.

6. The vertical band saw machine of claim 2, wherein said upright post is in form of a tube and spacedly surrounds said driving shaft, said vertical band saw machine further comprising an anti-friction bearing interposed between said tube and said driving shaft and disposed adjacent to said upper post end so as to enable said driving shaft to be rotatable relative to said upright post about the shaft axis.

7. The vertical band saw machine of claim 6, further comprising an overtension protecting mechanism that includes a plurality of recesses which are formed in said upper shaft portion and which are angularly displaced from each other about the shaft axis, a handle which has an actuating end that is disposed to rotatably surround said upper shaft portion, and an operated end that is manually operable to rotate said actuating end about the shaft axis, and a plurality of spring-loaded rollable members which are disposed in said actuating end and which are moved between an engaging position, where each of said spring-loaded rollable members is forced to engage a respective one of said recesses by virtue of a predetermined biasing force of a respective spring so as to permit rotational force of said actuating end to be transferred for rotating said upper shaft portion, thereby displacing said coupling end of said mounting frame between the loosened position and the tensed position, and a disengaging position, where the respective one of said spring-biased rollable members is forced out of engagement with said recesses by a predetermined tension force of said endless band saw blade which holds said upper shaft portion against rotation with said spring-loaded rollable members, thereby preventing overtensing of said band saw blade.

* * * * *